Oct. 28, 1969    D. KISSIL ETAL    3,474,763
DEVICE FOR RESTRAINING SMALL LABORATORY ANIMALS
Filed Dec. 11, 1967    2 Sheets-Sheet 1

INVENTORS:
DONALD KISSIL
FERDINAND A. GERCKE
BY
Albert H Graddis
ATTORNEY

Oct. 28, 1969  D. KISSIL ET AL  3,474,763
DEVICE FOR RESTRAINING SMALL LABORATORY ANIMALS
Filed Dec. 11, 1967  2 Sheets-Sheet 2
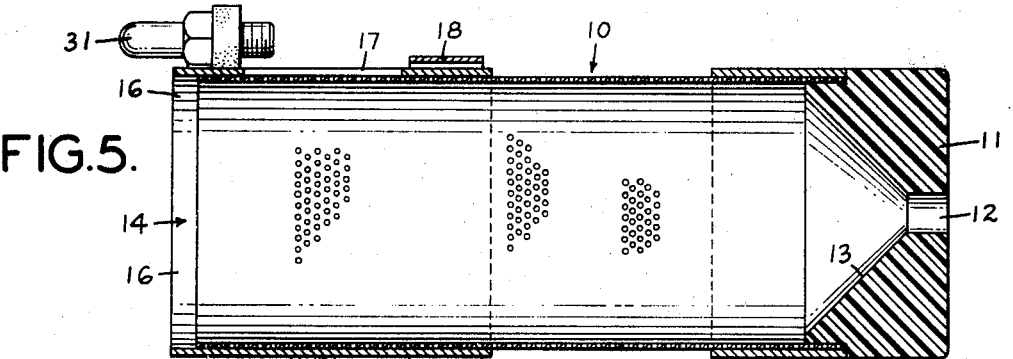
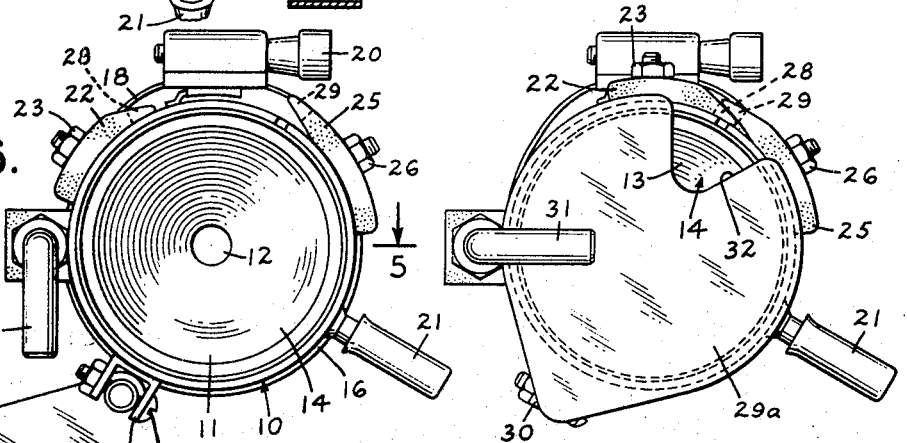
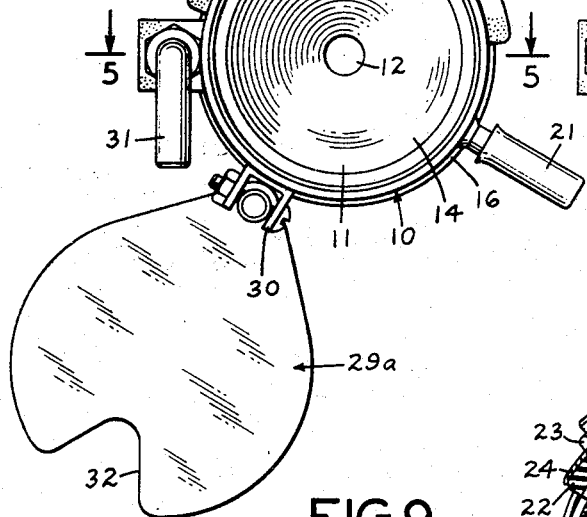
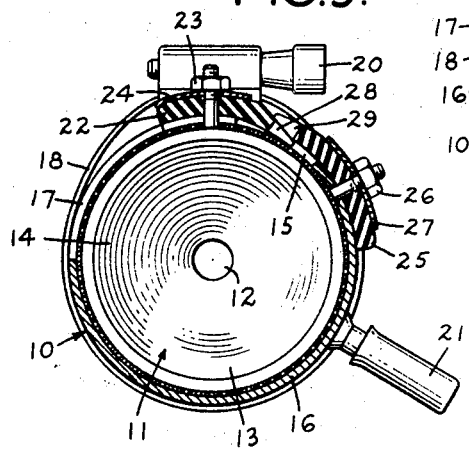
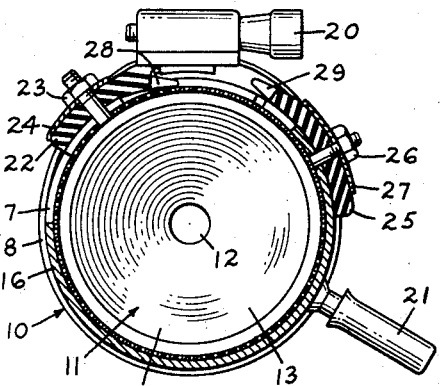
INVENTORS:
DONALD KISSIL
FERDINAND A. GERCKE
BY
Albert H Graddis
ATTORNEY United States Patent Office 3,474,763
Patented Oct. 28, 1969

3,474,763
DEVICE FOR RESTRAINING SMALL
LABORATORY ANIMALS
Donald Kissil, Morristown, and Ferdinand A. Gercke,
Morris Plains, N.J., assignors to Warner-Lambert
Pharmaceutical Company, Morris Plains, N.J., a corporation of Delaware
Filed Dec. 11, 1967, Ser. No. 689,617
Int. Cl. A01k 29/00; A61d 3/00
U.S. Cl. 119—96          2 Claims

ABSTRACT OF THE DISCLOSURE

The instant invention relates to a novel restraining cage for small animals. The device described includes means for exposing the leg and tail members of the animal outside of the body of the cage.

BACKGROUND OF THE INVENTION

Field of the invention

Animal restraining device for use in laboratories.

Prior art

Many devices are known which are useful for restraining small laboratory animals. Several of these devices provide means for exposing a rodent's tail in a relatively fixed position; however, they do not provide for the simultaneous exposure of the rodent's leg in a fixed position by the same device.

SUMMARY OF THE INVENTION

The instant invention relates to a novel cage for restraining small animals comprising a hollow body having a rotatable sleeve mounted thereon. When the sleeve is rotated about the hollow body an opening in the hollow body is exposed through which the leg of an animal may be withdrawn and exposed outside the cage. A hinged door with an aperture therein permits the animal's tail to be exposed outside the cage. The cage thus provides means for holding both the leg and tail members outside the cage in relatively fixed positions. With the animal thus caged, a single technician may inject into and withdraw fluids from the body of the animal at several different sites of injection.

DESCRIPTION OF THE DRAWINGS

FIG. 5 is a cross-sectional view of the cage taken along the line 5—5 of FIG. 2 and in the direction shown, the closure at one end being provided with a conical space which serves to restrain the animal's head.

FIG. 6 is an end view of the cage in the direction of the conical space at the opposite end with the hinged door as well as the rotatable sleeve in fully open position.

FIG. 7 is an end view of the cage similar to that of FIG. 6 but showing both the hinged door and rotatable sleeve in their closed positions.

FIG. 8 is a cross-sectional view of the cage taken along lines 8—8 in FIG. 1 and in the direction of the arrows showing the rotatable sleeve portion rotated to its open position, and FIG. 9 is a cross-sectional view of the cage taken along lines 9—9 in FIG. 4 in the direction of the arrows and showing the sleeve portion rotated to its closed position.

Like reference numerals indicate like parts throughout the several views of the drawings.

DESCRIPTION

This invention relates to an apparatus useful for caging and restraining small animals, such as rodents, rabbits, guinea pigs, mice, hamsters, etc., while being utilized in various experimental laboratory procedures.

In clinical laboratories small animals such as rodents are often used in various testing procedures. The test procedures typically require injection into or withdrawal of fluids from the rodent. The site of choice to withdraw or inject fluide into a rodent is the rodent's tail vein. It is also frequently desirable to have an alternate site for injection or withdrawing fluids from the rodent and the alternate site of choice is usually the femoral vein. In certain other test procedures the plantar surface of the rodent's foot is the desirable injection site.

As indicated above, prior art restraining devices do provide means for exposing a rodent's tail in a relatively fixed position; however, they do not permit the simultaneous exposure of both the rodent's leg and tail with each in a fixed position when restrained in a single device. The apparatus of the present invention not only provides means for maintaining the rodent's tail in an exposed and available position, but also provides adjustable means suitable for maintaining the rodent's entire leg in an exposed position. Thus, by employing the device of this invention, the tail vein, the femoral vein and the plantar surface of the foot are made readily accessible to the technician for injection or withdrawal of fluids from the animal.

Figure 1:
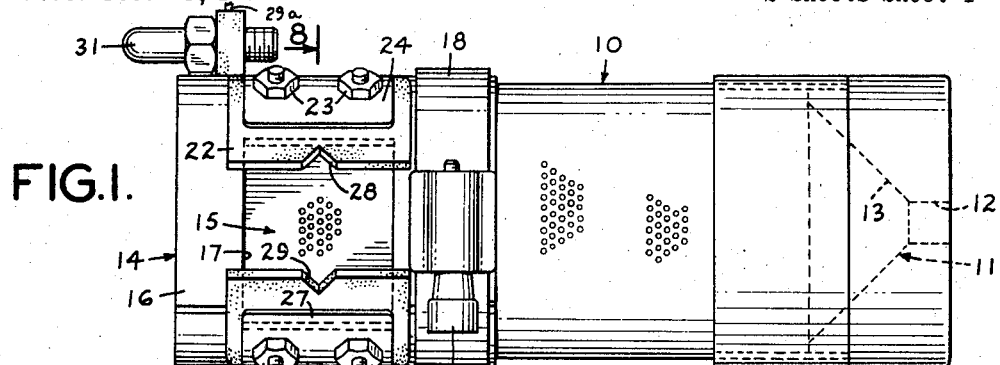
FIG. 1 is a side elevational view of the cage in which the width of the side opening in the hollow body through which the animal's leg can be withdrawn from the cage is shown at its maximum open dimension.
Figure 2:
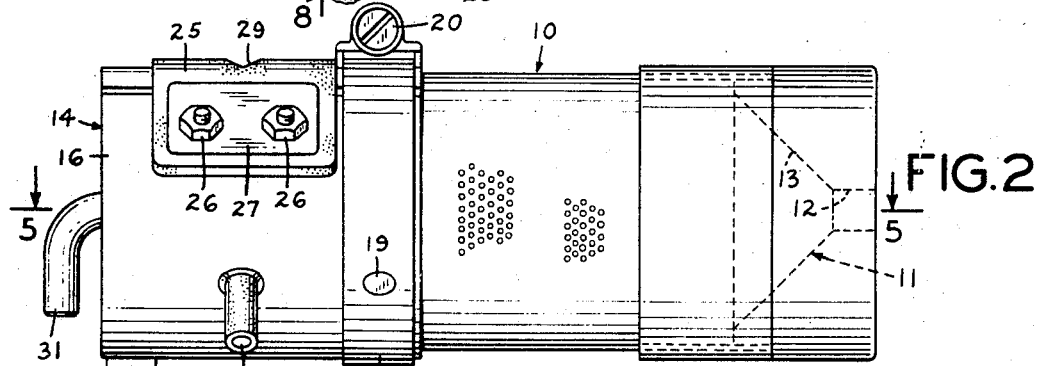
FIG. 2 is a side elevational view of the cage rotated about 120° from FIG. 1 and showing the hinged door at the end of the cage in its open position to permit ingress and egress from the cage.
Figure 3:
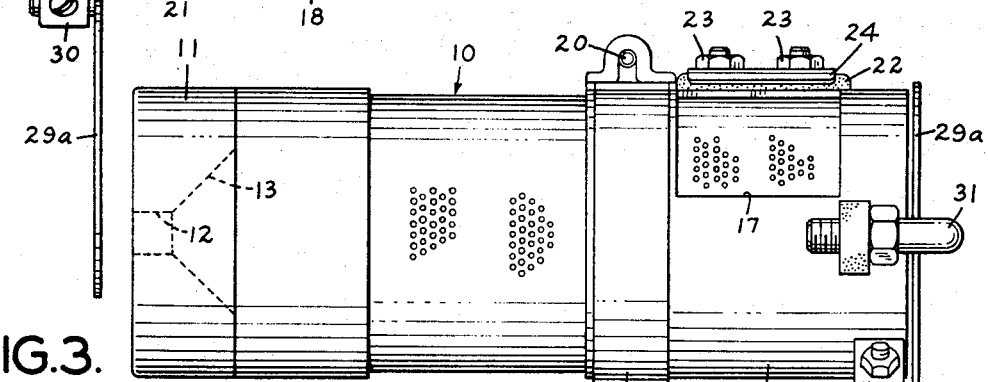
FIG. 3 is a side elevational view of the opposite side of the cage showing the hinged door at the end of the cage locked in closed position.

Referring to the drawings and more particularly to FIG. 1 the cage of this invention consists of an elongated hollow body 10 of a generally cylindrical shape, preferably formed of a mesh material provided with a plurality of holes. Hollow body 10 is closed at one end by a shaped plug 11 fitted to one end of body 10 and pierced by a hole 12 which serves to enable the confined animal to obtain ready access to air. Plug 11 is also provided with a conically shaped inner surface 13 to accommodate and confine the head of the caged animal. Hollow body 10 may be of varying dimensions to accommodate animals of varying sizes.

At the opposite end of hollow body 10 is a circular opening generally indicated by reference numeral 14 adapted to receive the animal being restrained, said opening being shown more clearly in FIGS. 5 and 6.

Adjacent to open end 14 of body 10 there is provided a rectangularly shaped opening 15 cut into the outer cylindrical wall which forms hollow body 10.

Cooperating with opening 15 is a rotatable sleeve 16 mounted on body 10 so as to be freely rotatable relative to said body 10. Sleeve 16 is also provided with a rectangularly shaped opening 17 which is so located as to be in alignment with said rectangularly shaped opening 15. When sleeve 16 is rotated relative to hollow body 10, opening 15 and 17 move relative to each other to expose the opening body 10 to a greater or lesser extent. The opening provided thus permits the withdrawal from the cage of either of the caged animals hind extremities, depending upon the position in which the animal is placed.

Rotatable sleeve 16 is mounted on body 10 and held in position by means of a ring 18 held on sleeve 16 by a rivet 19. The tightness of the grip of ring 18 on sleeve 16 and the ease of rotation relative to each other may be varied by means of a rotatable set screw 20 which takes up or increases the slack on ring 18 thus altering the tension. Handle 21 attached to sleeve 16 is provided to rotate sleeve 16 about body 10 in either clockwise or counterclockwise direction to widen or narrow the opening available between openings 15 and 17.

Body 10 has a wedge 22 mounted at the upper edge of rectangular opening 15 as shown in FIG. 1 by nuts 23 and pressure plate 24. A second wedge 25 is mounted on sleeve 16 at the lower edge of rectangular opening 17 by means of nuts 26 and pressure plate 27. Wedges 22 and 25 are preferably composed of a resilient elastic material, such as rubber, nylon, plastic, leather, etc.

Figure 4:
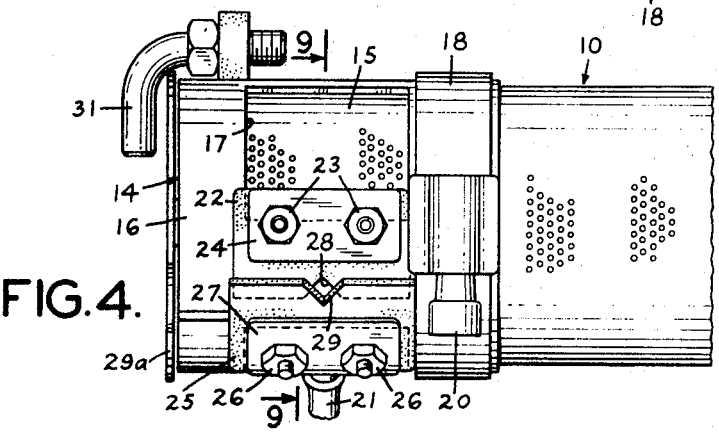
FIG. 4 is a side elevational view of the cage in which the opening in the hollow body through which the animal's leg can be withdrawn is shown in fully closed position.

Rotation of sleeve 16 relative to body 10 by means of handle 21 will cause wedges 22 and 25 to move toward or away from each other thus permitting the effective size of the opening between the wedges through which the animal's extremities may be withdrawn to be increased or decreased as desired. Rotation of sleeve 16 in a clockwise direction will increase the size of the opening to its maximum dimension as shown in FIG. 1 whereas counterclockwise rotation, as shown in FIG. 4, decreases the size of the opening to the minimum dimension.

Wedges 22 and 25 are provided with notches 28 and 29 to permit the animal's extremities to be held firmly in fixed position when exposed.

When the animal is placed in the cage, the opening 14 through which the animal enters the cage can then be closed by means of a door 29a attached to sleeve 16 by hinge 30. When door 29a is rotated about hinge 30 and closed, it can be locked in this position by a dog 31, as shown in FIG. 7. Door 29a with shaped hole 32 is provided in order to permit the animal's tail to pass through door 29a and to be held in the desired exposed yet relatively fixed position.

In use, an animal such as a rodent is placed inside the cage through opening 14 with its tail extended outwardly. Door 29a is closed and the animal's tail passed through hole 32. The technician then rotates sleeve 16 so that opening 17 is at its maximum dimension. He then withdraws the animal's foot or entire leg from the cage, as the case may be, and by rotating sleeve 16 relative to body 10 then closes the notched wedges 22 and 25 around the exposed foot or leg thereby holding the extremity outside the body of the cage in a firm and fixed position.

Having thus described our invention what is claimed is:
1. A restraining cage for a rodent which comprises:
   (1) a hollow body closed at one end and having an opening at the other end;
   (2) an opening in the side wall of said hollow body;
   (3) a door adapted to close said open end and provided with a passage through which a part of the restrained rodent may be exposed when said door is closed; and
   (4) a rotatable sleeve mounted on and cooperating with the opening in the side wall of said hollow body, the rotation of said sleeve relative to said hollow body providing another opening of variable size in the wall of said hollow body.
2. A restraining cage for an animal according to claim 1 wherein the operative edges of the variable sized opening are provided with a resilient elastic material.

References Cited

UNITED STATES PATENTS

| | | | |
|---|---|---|---|
| 2,498,051 | 2/1950 | Shipley | 119—99 |
| 2,540,650 | 2/1951 | Brosene et al. | 119—98 |
| 2,603,184 | 7/1952 | Cook | 119—96 |
| 3,094,101 | 6/1963 | Porter | 119—103 |

HUGH R. CHAMBLEE, Primary Examiner

U.S. Cl. X.R.

119—103